United States Patent
Ishikawa et al.

(10) Patent No.: US 9,174,630 B2
(45) Date of Patent: Nov. 3, 2015

(54) CONTROL DEVICE FOR TRANSMISSION AND BRAKING TORQUE GENERATION DETERMINATION METHOD FOR TRANSMISSION

(75) Inventors: Tomomi Ishikawa, Anjo (JP); Shoji Fushimi, Ichinomiya (JP); Masaki Nishide, Okazaki (JP); Tsunekazu Inakura, Anjo (JP); Masatoshi Taguchi, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 13/984,142

(22) PCT Filed: Mar. 30, 2012

(86) PCT No.: PCT/JP2012/058591
§ 371 (c)(1),
(2), (4) Date: Aug. 7, 2013

(87) PCT Pub. No.: WO2012/133772
PCT Pub. Date: Oct. 4, 2012

(65) Prior Publication Data
US 2013/0325274 A1    Dec. 5, 2013

(30) Foreign Application Priority Data

Mar. 31, 2011    (JP) ................................. 2011-077236

(51) Int. Cl.
*G06F 7/00*     (2006.01)
*G06F 17/00*    (2006.01)
(Continued)

(52) U.S. Cl.
CPC ............... *B60W 10/10* (2013.01); *B60W 10/04* (2013.01); *B60W 10/196* (2013.01); *F16H 61/12* (2013.01); *B60Y 2400/3084* (2013.01); *F16H 2061/1204* (2013.01); *F16H 2061/1208* (2013.01)

(58) Field of Classification Search
CPC ........................... B60W 10/10; B60W 2710/00
USPC ........................................ 701/51, 58, 87, 95
See application file for complete search history.

(56) References Cited

U.S. PATENT DOCUMENTS

| | | |
|---|---|---|
| 5,209,141 A | 5/1993 | Asayama et al. |
| 5,251,091 A | 10/1993 | Ito et al. |

(Continued)

FOREIGN PATENT DOCUMENTS

| | | |
|---|---|---|
| JP | A-2004-198308 | 7/2004 |
| JP | A-2007-24096 | 2/2007 |

(Continued)

OTHER PUBLICATIONS

International Search Report issued in International Patent Application No. PCT/3P2012/058591 dated Jun. 12, 2012.

(Continued)

Primary Examiner — Imran Mustafa
(74) Attorney, Agent, or Firm — Oliff PLC

(57) ABSTRACT

A control device for a transmission including m (m≥3) solenoid valves and configured to establish a plurality of shift speeds by engaging n1 (2≤n1<m) engagement elements using hydraulic pressures of n1 solenoid valves among the m solenoid valves, the control device. The control device having an actual current value detection unit that detects respective values of actual currents flowing through solenoids of the m solenoid valves; and a determination unit that determines whether or not braking torque is generated on an output shaft of the transmission by comparing the detected actual current values for solenoids of n2 (n1<n2≤m) solenoid valves and a current threshold.

6 Claims, 7 Drawing Sheets

(51) Int. Cl.
*G06F 19/00* (2011.01)
*B60W 10/10* (2012.01)
*F16H 61/12* (2010.01)
*B60W 10/04* (2006.01)
*B60W 10/196* (2012.01)

(56) References Cited

U.S. PATENT DOCUMENTS

| | | | |
|---|---|---|---|
| 5,733,223 A * | 3/1998 | Matsubara et al. | 477/175 |
| 2006/0036359 A1 | 2/2006 | Thor et al. | |
| 2006/0046896 A1* | 3/2006 | Nakajima et al. | 477/107 |
| 2007/0015264 A1 | 1/2007 | Isotani et al. | |
| 2007/0015624 A1* | 1/2007 | Ota et al. | 477/34 |
| 2007/0068268 A1* | 3/2007 | Dell'Eva et al. | 73/753 |
| 2007/0179018 A1* | 8/2007 | Endo et al. | 477/125 |
| 2008/0006107 A1 | 1/2008 | Dreher et al. | |
| 2009/0171545 A1 | 7/2009 | Shimizu et al. | |
| 2010/0163360 A1* | 7/2010 | Fujii et al. | 192/3.33 |

FOREIGN PATENT DOCUMENTS

| | | | |
|---|---|---|---|
| JP | A-2007-205371 | | 8/2007 |
| JP | 2008281111 A | * | 11/2008 |
| JP | A-2008-281111 | | 11/2008 |
| JP | A-2011-027064 | | 2/2011 |

OTHER PUBLICATIONS

U.S. Appl. No. 13/984,159, filed Aug. 7, 2013.
Nov. 18, 2014 Search Report issued in European Application No. 12764098.5.
Nov. 18, 2014 Search Report issued in European Application No. 12763084.6.
Jul. 14, 2015 Office Action issued in U.S. Appl. No. 13/984,159.

* cited by examiner

|   | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| D 1st | ○ |  |  |  | ● | ○ |
| D 2nd | ○ |  |  | ○ |  |  |
| D 3rd | ○ |  | ○ |  |  |  |
| D 4th | ○ | ○ |  |  |  |  |
| D 5th |  | ○ | ○ |  |  |  |
| D 6th |  | ○ |  | ○ |  |  |

○: ENGAGED, ●: ENGAGED WITH ENGINE BRAKE IN OPERATION

F I G . 5
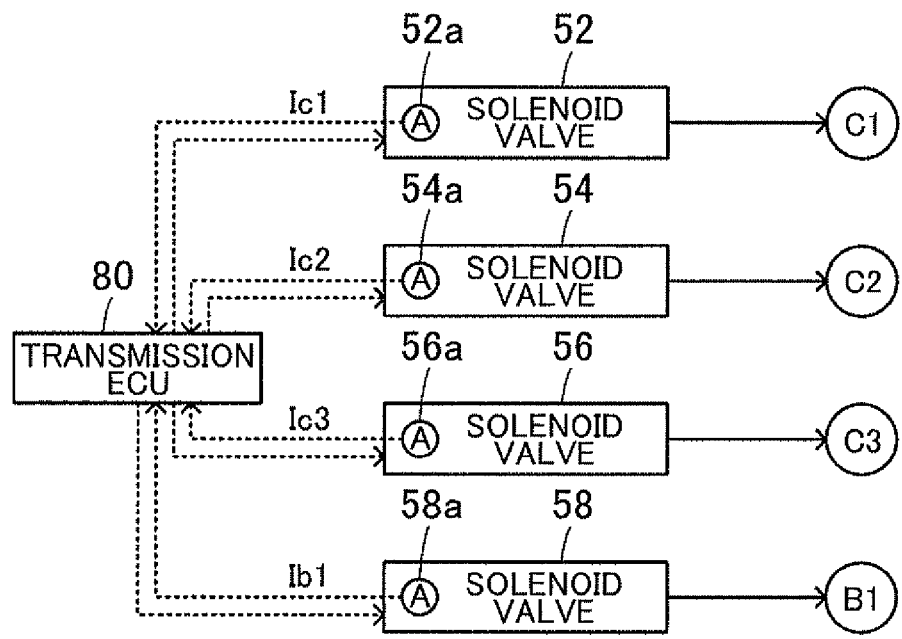
F I G . 6
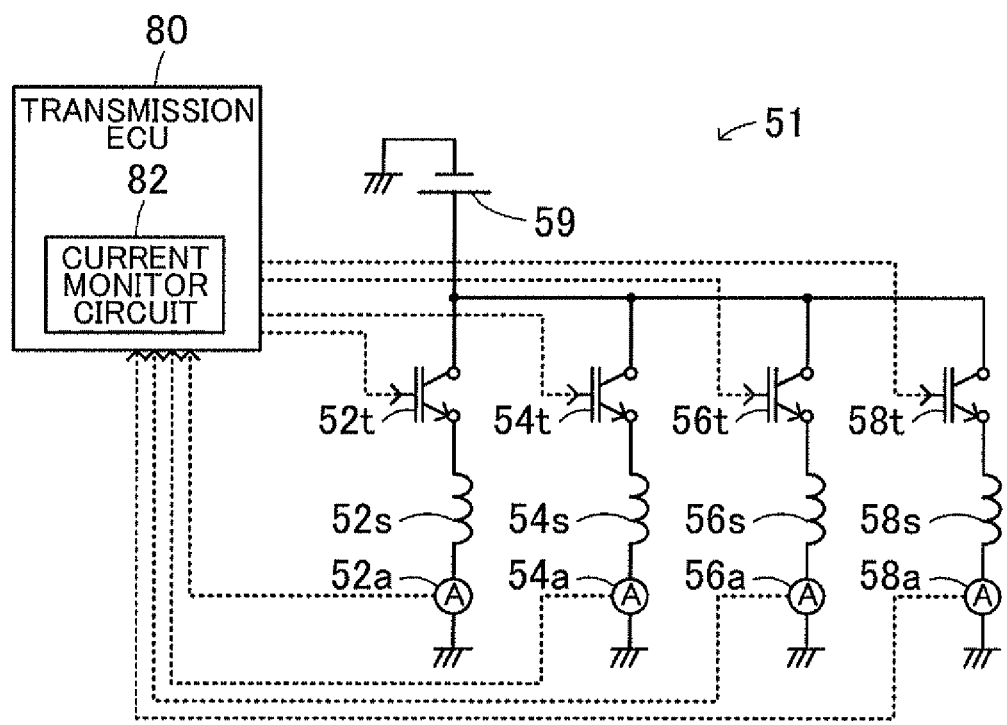

| | | C-1 | C-2 | C-3 | C-4 | C-5 | C-6 | B-1 | B-2 | F-1 |
|---|---|---|---|---|---|---|---|---|---|---|
| D | 1st | O | | | | O | | | ● | O |
| | 2nd | O | | | | O | | O | | |
| | 3rd | O | | | | | O | O | | |
| | 4th | O | | O | | | O | | | |
| | 5th | O | | | O | | O | | | |
| | 6th | O | O | | | | O | | | |
| | 7th | | O | | O | | O | | | |
| | OD1 | | O | O | | | O | | | |
| | OD2 | | O | O | | O | | | | |
| | OD3 | | O | | | (O) | | O | | |
| R | Rev1 | | | O | | O | | | O | |
| | Rev2 | | | O | | | | O | O | |
| | Rev3 | | | | O | O | | | O | |
| | Rev4 | | | | O | | O | | O | |

O: ENGAGED, ●: ENGAGED WITH ENGINE BRAKE IN OPERATION

CONTROL DEVICE FOR TRANSMISSION AND BRAKING TORQUE GENERATION DETERMINATION METHOD FOR TRANSMISSION

INCORPORATION BY REFERENCE

The disclosure of Japanese Patent Application No. 2011-077236 filed on Mar. 31, 2011 including the specification, drawings and abstract is incorporated herein by reference in its entirety.

BACKGROUND OF THE INVENTION

The present invention relates to a control device for a transmission and a braking torque generation determination method for a transmission.

DESCRIPTION OF THE RELATED ART

Hitherto, there has been proposed a control device for a transmission in which two among five linear solenoid valves are driven to establish a speed gear, and which, when the total sum of current values (command current values) of solenoids of any three linear solenoid valves becomes equal to or more than a threshold, determines that the three linear solenoid valves are driven at the same time (see Japanese Patent Application Publication No. 2008-281111 (JP 2008-281111 A), for example).

SUMMARY OF THE INVENTION

In recent years, in view of the tendency toward an increase of electric/electronic systems mounted on automobiles, there has been an increasing need for safety achieved through functional elaboration (so-called "functional safety") for minimizing damage caused by a fault caused in each element forming the electric/electronic systems. In order to achieve the "functional safety", it is desired for a control device for a transmission to determine an abnormality in each element of the electric/electronic systems.

In the transmission discussed above, braking torque is generated on an output shaft when three linear solenoid valves are driven at the same time (three engagement elements are engaged at the same time). In the control device for the transmission discussed above, command current values are used, and thus the effect of fluctuations in hydraulic pressures of linear solenoid valves may not be reflected in the determination as to whether or not three linear solenoid valves are driven at the same time, which may result in an erroneous determination.

It is a main object of the control device for a transmission and the braking torque generation determination method for a transmission according to the present invention to more adequately determine whether or not braking torque is generated on an output shaft of the transmission.

In order to achieve the foregoing main object, the control device for a transmission and the braking torque generation determination method for a transmission according to the present invention adopt the following means.

A first aspect of the present invention relates to a control device for a transmission including m (m≥3) solenoid valves and configured to establish a plurality of shift speeds by engaging n1 (2≤n1<m) engagement elements using hydraulic pressures of n1 solenoid valves among the m solenoid valves, the control device including:

an actual current value detection unit that detects respective values of actual currents flowing through solenoids of the m solenoid valves; and a determination unit that determines whether or not braking torque is generated on an output shaft of the transmission by comparing the detected actual current values for solenoids of n2 (n1<n2≤m) solenoid valves and a current threshold.

In the control device for a transmission according to the first aspect of the present invention, it is determined whether or not braking torque is generated on the output shaft of the transmission by detecting the respective values of actual currents flowing through the solenoids of the m solenoid valves, and comparing the actual current values for solenoids of n2 (n1<n2≤m) solenoid valves and the current threshold. It is considered that braking torque is generated on the output shaft of the transmission when n2 engagement elements are engaged with an abnormality caused in the solenoid valves, the control device, or a signal transfer system between the solenoid valves and the control device etc. By comparing the actual current values for the solenoids of the n2 solenoid valves and the current threshold, the determination as to whether or not braking torque is generated on the output shaft of the transmission can be made more adequately in the light of the effect of the hydraulic pressures of the n2 solenoid valves (such as fluctuations in counter-electromotive force (current) of the solenoids of the solenoid valves due to fluctuations in hydraulic pressure, for example) etc. compared to a case where a comparison is made between current command values for the n2 solenoid valves and the current threshold. Here, the "engagement elements" include clutches that connect and disconnect two rotary systems to and from each other, and brakes that fix and unfix a rotary system to and from a non-rotary system such as a case. In addition, engagement of the engagement elements includes not only complete engagement but also half engagement (engagement with a rotational speed difference between the input side and the output side of the engagement elements). Further, the comparison between the actual current values for the solenoids of the n2 solenoid valves and the current threshold may include a comparison between each of the actual current values for the solenoids of the n2 solenoid valves and the current threshold, and a comparison between the total sum of the actual current values for the solenoids of the n2 solenoid valves and the current threshold.

In the control device for a transmission according to the first aspect of the present invention, the determination unit may be configured not to determine whether or not braking torque is generated on the output shaft of the transmission during execution of fast fill for changing a shift speed of the transmission. During execution of fast fill, both the actual current value for a solenoid of a solenoid valve corresponding to an engagement element (engagement-side element) that is brought from the disengaged state into the engaged state and the actual current value for a solenoid of a solenoid valve corresponding to an engagement element (disengagement-side element) that is brought from the engaged state into the disengaged state may have such values that can be construed as the engaged state. In this case, an erroneous determination may be made if it is determined whether or not braking torque is generated on the output shaft of the transmission. Thus, an erroneous determination can be suppressed by not determining whether or not braking torque is generated on the output shaft of the automatic transmission during execution of fast fill.

In the control device for a transmission according to the first aspect of the present invention, in addition, the determination unit may determine that braking torque is generated on the output shaft of the transmission when the detected actual current values for the solenoids of the n2 solenoid valves which are normally closed are equal to or more than the current threshold. Alternatively, the determination unit may determine that braking torque is generated on the output shaft of the transmission when the detected actual current values for the solenoids of the n2 solenoid valves which are normally open are equal to or less than the current threshold. Further, the determination unit may determine that braking torque is generated on the output shaft of the transmission when the detected actual current values for solenoids of normally closed solenoid valves among the n2 solenoid valves are equal to or more than the current threshold and the detected actual current values for solenoids of normally open solenoid valves among the n2 solenoid valves are equal to or less than the current threshold.

A second aspect of the present invention relates to
a braking torque generation determination method for a transmission for determining whether or not braking torque is generated on an output shaft of the transmission, the transmission including m (m≥3) solenoid valves and being configured to establish a plurality of shift speeds by engaging n1 (2≤n1<m) engagement elements using hydraulic pressures of n1 solenoid valves among the m solenoid valves, the braking torque generation determination method including the steps of:
(a) detecting respective values of actual currents flowing through solenoids of the m solenoid valves; and
(b) determining whether or not braking torque is generated on the output shaft of the transmission by comparing the detected actual current values for solenoids of n2 (n1<n2≤m) solenoid valves and a current threshold.

In the braking torque generation determination method for a transmission according to the second aspect of the present invention, it is determined whether or not braking torque is generated on the output shaft of the transmission by detecting the respective values of actual currents flowing through the solenoids of the m solenoid valves, and comparing the actual current values for solenoids of n2 (n1<n2≤m) solenoid valves and the current threshold. It is considered that braking torque is generated on the output shaft of the transmission when n2 engagement elements are engaged with an abnormality caused in the solenoid valves, the control device, or a signal transfer system between the solenoid valves and the control device etc. By comparing the actual current values for the solenoids of the n2 solenoid valves and the current threshold, the determination as to whether or not braking torque is generated on the output shaft of the transmission can be made more adequately in the light of the effect of the hydraulic pressures of the n2 solenoid valves (such as fluctuations in counter-electromotive force (current) of the solenoids of the solenoid valves due to fluctuations in hydraulic pressure, for example) etc. compared to a case where a comparison is made between current command values for the n2 solenoid valves and the current threshold. Here, the "engagement elements" include clutches that connect and disconnect two rotary systems to and from each other, and brakes that fix and unfix a rotary system to and from a non-rotary system such as a case. In addition, engagement of the engagement elements includes not only complete engagement but also half engagement (engagement with a rotational speed difference between the input side and the output side of the engagement elements). Further, the comparison between the actual current values for the solenoids of the n2 solenoid valves and the current threshold may include a comparison between each of the actual current values for the solenoids of the n2 solenoid valves and the current threshold, and a comparison between the total sum of the actual current values for the solenoids of the n2 solenoid valves and the current threshold.

BRIEF DESCRIPTION OF THE DRAWINGS

FIG. 5 illustrates an example of the relationship between the clutches C1 to C3 and the brake B-1 and linear solenoid valves 52 to 58;

FIG. 6 is a diagram showing a schematic configuration of an electrical system 51 including solenoids 52s to 58s of the linear solenoid valves 52 to 58;

DETAILED DESCRIPTION OF THE EMBODIMENTS

Now, an embodiment of the present invention will be described below.

Figure 1:
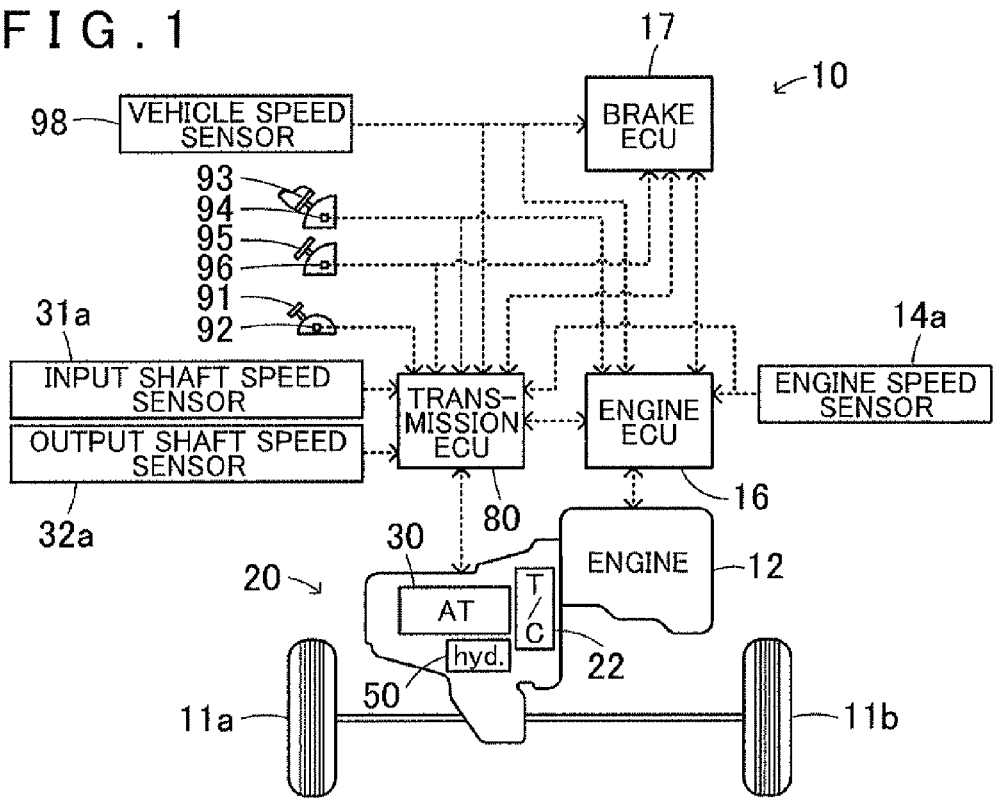
FIG. 1 is a diagram showing a schematic configuration of an automobile 10 on which an automatic transmission apparatus 20 according to an embodiment of the present invention is mounted.
Figure 2:
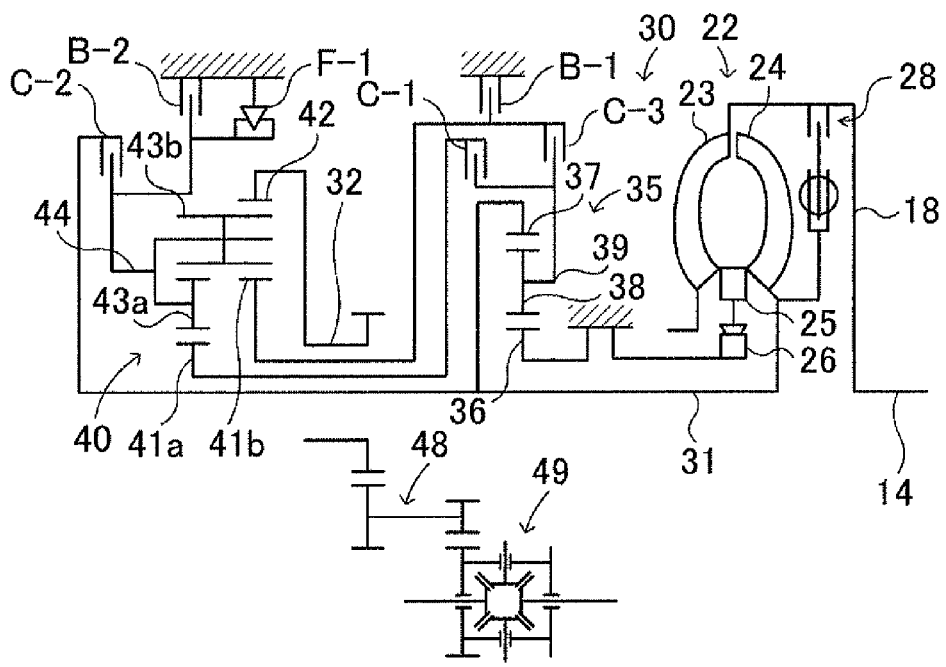
FIG. 2 is a diagram showing a schematic mechanical configuration of the automatic transmission apparatus 20.

FIG. 1 is a diagram showing a schematic configuration of an automobile 10 on which an automatic transmission apparatus 20 according to an embodiment of the present invention is mounted. FIG. 2 is a diagram showing a schematic mechanical configuration of the automatic transmission apparatus 20. As shown in FIGS. 1 and 2, the automobile 10 according to the embodiment includes: an engine 12 which is an internal combustion engine that outputs power generated by explosive combustion of a hydrocarbon fuel such as gasoline and light oil; an engine electronic control unit (hereinafter referred to as "engine ECU") 16 that controls operation of the engine 12; a fluid transmission apparatus 22 attached to a crankshaft 14 of the engine 12; a stepped automatic transmission 30 including an input shaft 31 connected to the output side of the fluid transmission apparatus 22 and an output shaft 32 connected to drive wheels 11a and 11b via a gear mechanism 48 and a differential gear 49 to transfer to the output shaft 32 power input to the input shaft 31 while changing the speed of the power; a hydraulic circuit 50 that supplies and discharges hydraulic oil to and from the fluid transmission apparatus 22 and the automatic transmission 30; a transmission electronic control unit (hereinafter referred to as "transmission ECU") 80 that controls the fluid transmission apparatus 22 and the automatic transmission 30 by controlling the hydraulic circuit 50; and a brake electronic control unit (hereinafter referred to as "brake ECU") 17 that controls an electronically controlled hydraulic brake unit (not shown). Here, the automatic transmission apparatus 20 according to the embodiment is mainly composed of the automatic transmission 30, the hydraulic circuit 50, and the transmission ECU 80. In addition, the control device for a transmission according to the embodiment corresponds to the transmission ECU 80.

The engine ECU 16 is formed as a microprocessor including a CPU as its main component, and includes a ROM that stores a processing program, a RAM that temporarily stores data, input and output ports, and a communication port in addition to the CPU. Signals from various sensors that detect the operating state of the engine 12, such as an engine speed Ne from a rotational speed sensor 14a attached to the crankshaft 14, and signals such as an accelerator operation amount Acc from an accelerator pedal position sensor 94 that detects the accelerator operation amount Acc corresponding to the amount of depression of an accelerator pedal 93 and a vehicle speed V from a vehicle speed sensor 98 are input to the engine ECU 16 via the input port. Signals such as a drive signal for a throttle motor that drives a throttle valve, a control signal for a fuel injection valve, and an ignition signal for an ignition plug are output from the engine ECU 16 via the output port.

As shown in FIG. 2, the fluid transmission apparatus 22 is formed as a fluidic torque converter with a lock-up clutch, and includes a pump impeller 23 serving as an input-side fluid transmission element connected to the crankshaft 14 of the engine 12 via a front cover 18, a turbine runner 24 serving as an output-side fluid transmission element connected to the input shaft 31 of the automatic transmission 30 via a turbine hub, a stator 25 disposed inside the pump impeller 23 and the turbine runner 24 to rectify the flow of hydraulic oil from the turbine runner 24 to the pump impeller 23, a one-way clutch 26 that restricts rotation of the stator 25 to one direction, and a lock-up clutch 28 having a damper mechanism. The fluid transmission apparatus 22 functions as a torque amplifier through the action of the stator 25 when the difference between the respective rotational speeds of the pump impeller 23 and the turbine runner 24 is large, and functions as a fluid coupling when the difference between the respective rotational speeds of the pump impeller 23 and the turbine runner 24 is small. The lock-up clutch 28 can establish and release lock-up in which the pump impeller 23 (front cover 18) and the turbine runner 24 (turbine hub) are coupled to each other. When conditions for turning on lock-up are met after the automobile 10 starts moving, the lock-up clutch 28 establishes lock-up between the pump impeller 23 and the turbine runner 24 so that power from the engine 12 is mechanically and directly transferred to the input shaft 31. In this event, variations in torque to be transferred to the input shaft 31 are absorbed by the damper mechanism.

Figures 3, 4:
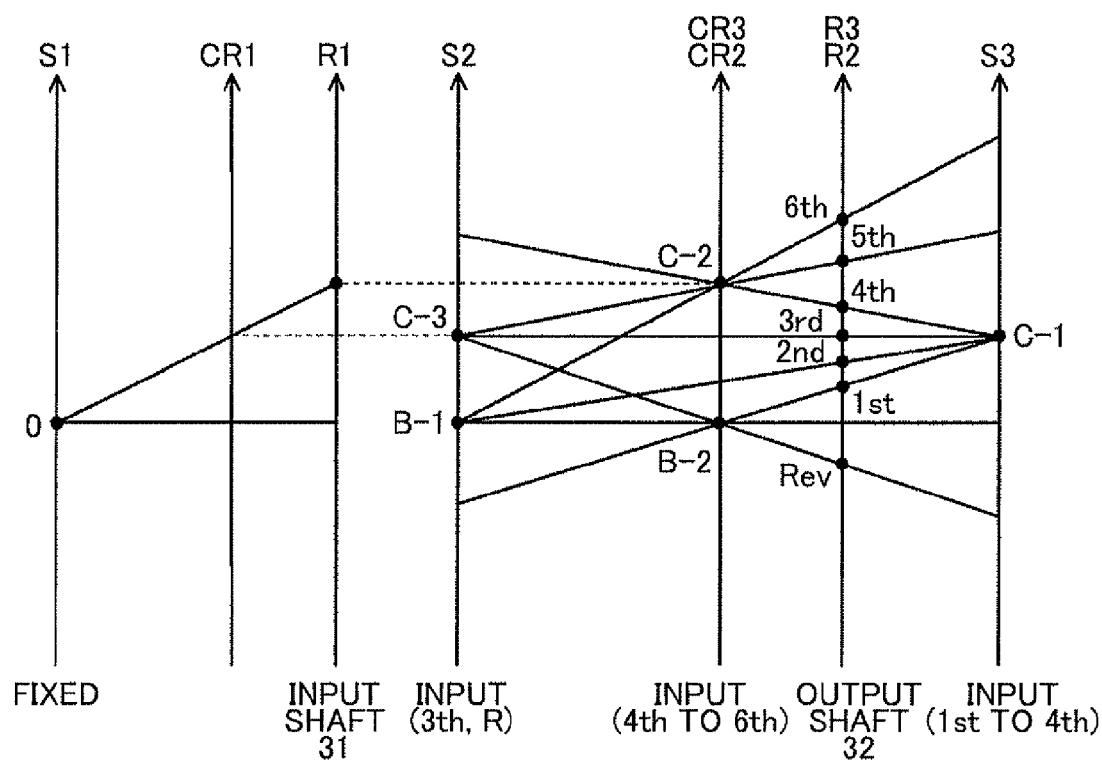
FIG. 3 is an operation table showing the relationship between each shift speed of an automatic transmission 30 and the respective operating states of clutches C1 to C3 and brakes B-1 and B-2.
FIG. 4 is a collinear diagram illustrating the relationship between the respective rotational speeds of rotary elements forming the automatic transmission 30.

The automatic transmission 30 is formed as a 6-speed stepped transmission, and includes a single-pinion type planetary gear mechanism 35, a Ravigneaux type planetary gear mechanism 40, three clutches C-1, C-2, and C-3, two brakes B-1 and B-2, and a one-way clutch F-1. The single-pinion type planetary gear mechanism 35 includes a sun gear 36 which is an externally toothed gear, a ring gear 37 which is an internally toothed gear disposed concentrically with the sun gear 36, a plurality of pinion gears 38 meshed with the sun gear 36 and meshed with the ring gear 37, and a carrier 39 that holds the plurality of pinion gears 38 so as to be rotatable about their respective axes and revolvable around a common axis. The sun gear 36 is fixed to a case. The ring gear 37 is connected to the input shaft 31. The Ravigneaux type planetary gear mechanism 40 includes two sun gears 41a and 41b which are each an externally toothed gear, a ring gear 42 which is an internally toothed gear, a plurality of short pinion gears 43a meshed with the sun gear 41a, a plurality of long pinion gears 43b meshed with the sun gear 41b and the plurality of short pinion gears 43a and meshed with the ring gear 42, and a carrier 44 that couples the plurality of short pinion gears 43a and the plurality of long pinion gears 43b to each other and that holds the gears 43a and the gears 43b so as to be rotatable about their respective axes and revolvable around a common axis. The sun gear 41a is connected to the carrier 39 of the single-pinion type planetary gear mechanism 35 via the clutch C-1. The sun gear 41b is connected to the carrier 39 via the clutch C-3, and connected to the case via the brake B-1. The ring gear 42 is connected to the output shaft 32. The carrier 44 is connected to the input shaft 31 via the clutch C-2. The carrier 44 is also connected to the case via the brake B-2, and connected to the case via the one-way clutch F-1. FIG. 3 is an operation table showing the relationship between each shift speed of the automatic transmission 30 and the respective operating states of the clutches C1 to C3 and the brakes B-1 and B-2. FIG. 4 is a collinear diagram illustrating the relationship between the respective rotational speeds of rotary elements forming the automatic transmission 30. As shown in the operation table of FIG. 3, the automatic transmission 30 can switchably establish first to sixth forward positions, a reverse position, and a neutral position by turning on and off the clutches C-1 to C-3 (the on state corresponds to the engaged state, and the off state corresponds to the disengaged state) and turning on and off the brakes B-1 and B-2 in various combinations. In the embodiment, the three clutches C-1, C-2, and C-3 and the two brakes B-1 and B-2 are formed as hydraulically driven friction engagement elements (friction clutches and friction brakes) that are engaged by pressing friction plates using a piston.

The fluid transmission apparatus 22 and the automatic transmission 30 are actuated by the hydraulic circuit 50 drivably controlled by the transmission ECU 80. The hydraulic circuit 50 includes an oil pump that pumps hydraulic oil using power from the engine 12, a primary regulator valve that regulates the hydraulic oil from the oil pump to generate a line pressure PL, a secondary regulator valve that reduces the line pressure PL from the primary regulator valve to generate a secondary pressure Psec, a modulator valve that regulates the line pressure PL from the primary regulator valve to generate a constant modulator pressure Pmod, a manual valve that switches which (of the clutches C-1 to C-3 and the brakes B-1 and B-2) the line pressure PL from the primary regulator valve is supplied to in accordance with the operating position of a shift lever 91, and a plurality of normally closed linear solenoid valves 52 to 58 that regulate the line pressure PL from the manual valve in accordance with a current applied from an auxiliary battery (not shown) to generate a solenoid pressure for a corresponding one of the clutches C-1 to C-3 and the brakes B-1 and B-2. FIG. 5 illustrates an example of the relationship between the clutches C1 to C3 and the brake B-1 and linear solenoid valves 52 to 58. In the embodiment, the brake B-2 is supplied with hydraulic oil from the solenoid valve 56 corresponding to the clutch C-3 via a switching valve (not shown) when engine brake is in operation at a first forward speed, and supplied with hydraulic oil from the manual valve when the shift lever 91 is operated to the reverse position (R position). That is, in the embodiment, the hydraulic circuit 50 does not have a linear solenoid valve dedicated to the brake B-2.

FIG. 6 is a diagram showing a schematic configuration of an electrical system 51 including solenoids 52s to 58s of the linear solenoid valves 52 to 58. As shown in the drawing, the electrical system 51 includes the solenoids 52s to 58s, respective first ends of which are grounded, a DC power source 59, transistors 52t to 58t serving as switches connected between the DC power source 59 and respective second ends of the solenoids 52s to 58s, and current sensors 52a to 58a provided between the solenoids 52s to 58s and the ground to detect a current flowing through the solenoids 52s to 58s, respectively. In the electrical system 51, the current flowing through the solenoids 52s to 58s can be adjusted by adjusting the proportion of the on time of the transistors 52t to 58t, respectively.

The transmission ECU 80 is formed as a microprocessor including a CPU as its main component, and includes a ROM that stores a processing program, a RAM that temporarily stores data, input and output ports, and a communication port in addition to the CPU. The transmission ECU 80 additionally includes a current monitor circuit 82 that monitors currents (actual currents) Ic1 to Ic3 and Ib1 from the current sensors 52a to 58a (see FIG. 5). As shown in FIG. 1, signals from various sensors that detect the operating state of the engine 12, such as the engine speed Ne from the rotational speed sensor 14a attached to the crankshaft 14, an input shaft speed Nin from a rotational speed sensor 31a attached to the input shaft 31, an output shaft speed Nout from a rotational speed sensor 32a attached to the output shaft 32, the currents (actual currents) Ic1 to Ic3 and Ib1 from the current sensors 52a to 58a (see FIG. 5), a shift position SP from a shift position sensor 92 that detects the position of the shift lever 91, the accelerator operation amount Acc from the accelerator pedal position sensor 94, a brake pedal position BP from a brake pedal position sensor 96 that detects the amount of depression of a brake pedal 95, and the vehicle speed V from the vehicle speed sensor 98 are input to the transmission ECU 80 via the input port. Control signals based on command current values Ic1* to Ic3* and Ib1* for the transistors 52t to 58t (see FIG. 6) etc. are output from the transmission ECU 80 via the output port.

The engine ECU 16, the brake ECU 17, and the transmission ECU 80 are connected to each other via a communication port to exchange various control signals and data required for control with each other. In the embodiment, the shift position SP of the shift lever 91 includes a parking position (P position) used to park the vehicle, a reverse position (R position) for reverse travel, a neutral position (N position), and a normal drive position (D position) for forward travel.

Figure 7:
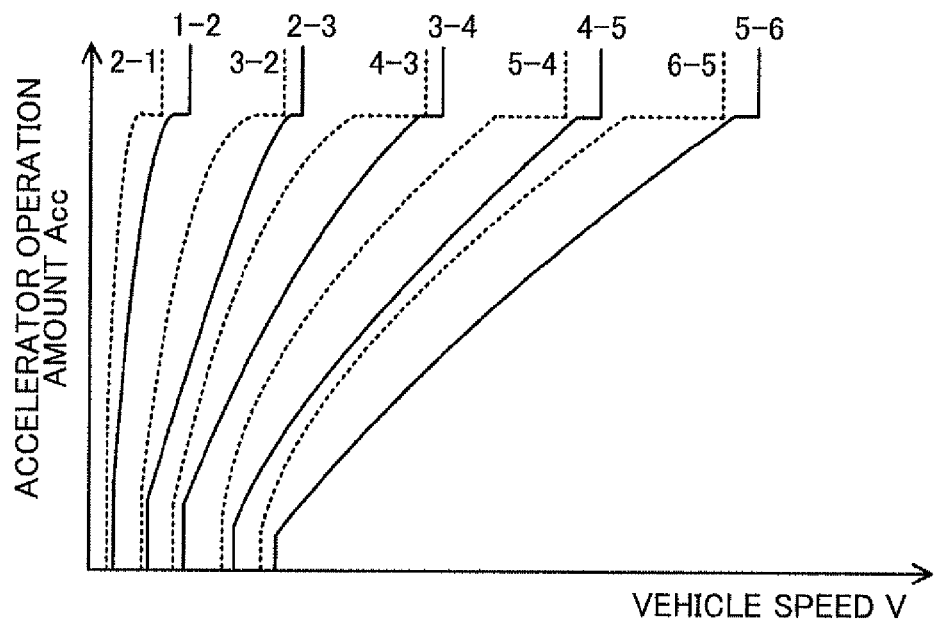
FIG. 7 illustrates an example of a speed change map.

In the thus configured automatic transmission apparatus 20 according to the embodiment, the transmission ECU 80 sets a target shift speed GS* on the basis of the accelerator operation amount Ace from the accelerator pedal position sensor 94, the vehicle speed V from the vehicle speed sensor 98, and a speed change map of FIG. 7, and controls the hydraulic circuit 50 such that the automatic transmission 30 establishes the set target shift speed GS*, that is, such that clutches and brakes corresponding to the target shift speed GS*, among the clutches C-1 to C-3 and the brakes B-1 and B-2, are turned on (engaged) and the other clutches and brakes are turned off (disengaged). Specifically, the clutches C-1 to C-3 and the brakes B-1 and B-2 are turned on and off as shown in the speed change map of FIG. 7. That is, when an operation point defined by the accelerator operation amount Ace and the vehicle speed V crosses a 1-2 upshift line, a 2-3 upshift line, a 3-4 upshift line, a 4-5 upshift line, and a 5-6 upshift line from left to right with a shift speed indicated by the left numeral or lower (for example, the first and second speeds for the 2-3 upshift line) being established, the clutches C-1 to C-3 and the brakes B-1 and B-2 are turned on and off such that an upshift is performed from the shift speed being established to the shift speed indicated by the right numeral (for example, the third speed for the 2-3 upshift line). Meanwhile, when an operation point defined by the accelerator operation amount Acc and the vehicle speed V crosses a 6-5 downshift line, a 5-4 downshift line, a 4-3 downshift line, a 3-2 downshift line, and a 2-1 downshift line from right to left with a shift speed indicated by the left numeral or higher (for example, the fourth to sixth speeds for the 4-3 downshift line) being established, the clutches C-1 to C-3 and the brakes B-1 and B-2 are turned on and off such that a downshift is performed from the shift speed being established to the shift speed indicated by the right numeral (for example, the third speed for the 4-3 downshift line). In the following description, among the clutches C-1, C-2, and C-3 and the brakes B-1 and B-2 serving as a plurality of friction engagement elements, a friction engagement element that is turned from off to on and a friction engagement element that is turned from on to off when the shift speed of the automatic transmission 30 is changed are referred to as "engagement-side element" and "disengagement-side element", respectively.

Figure 8:
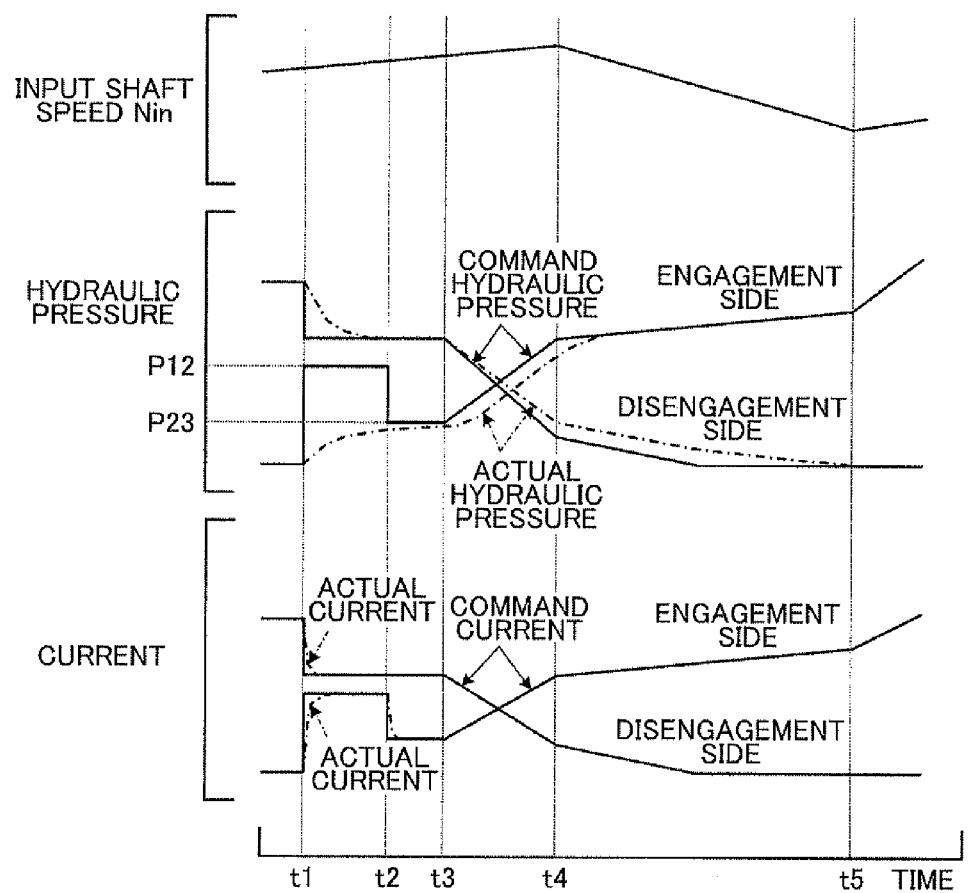
FIG. 8 schematically illustrates temporal variations in input shaft speed Nin, hydraulic pressure command values and actual hydraulic pressures of an engagement-side element and a disengagement-side element, and current command values and actual currents of solenoid valves corresponding to the engagement-side element and the disengagement-side element at the time when the shift speed of the automatic transmission 30 is changed.

FIG. 8 schematically illustrates temporal variations in input shaft speed Nin, hydraulic pressure command values and actual hydraulic pressures of the engagement-side element and the disengagement-side element, and current command values and actual currents of linear solenoid valves corresponding to the engagement-side element and the disengagement-side element at the time when the shift speed of the automatic transmission 30 is changed. In order to change the shift speed of the automatic transmission 30, as shown in the drawing, a speed change process is started (time t1). For the engagement-side element, first, fast fill, or so-called "play filling", for eliminating an ineffective stroke of the piston is executed (time t1 to time t2), and low-pressure stand-by is executed after the completion of the fast fill (time t2 to time t3). Specifically, a predetermined signal is output to the linear solenoid valve so as to bring the engagement-side hydraulic pressure to a predetermined hydraulic pressure P12. The predetermined hydraulic pressure P12 is a pressure that fills a hydraulic chamber of a hydraulic servo (not shown) and that moves a piston for engagement of the engagement element from the position of attachment to the position immediately before the piston contacts friction plates of the engagement element (position at which no torque is transferred). The predetermined hydraulic pressure P12 is held during a predetermined time (t1 to t2) (fast fill). When a predetermined time (t1 to t2) elapses, the engagement-side hydraulic pressure is brought to a predetermined low pressure P23 lower than the predetermined hydraulic pressure P12, and held at the predetermined low pressure P23 (low-pressure stand-by). The predetermined low pressure P23 is set to such a pressure that does not cause variations in input shaft speed Nin under any circumstances, and the predetermined low pressure P23 is held until a predetermined time (t2 to t3) elapses. For the disengagement-side element, meanwhile, the hydraulic pressure is reduced by one step from an engagement hydraulic pressure, at which the disengagement-side element is completely engaged, to bring the disengagement-side element into slip engagement. During execution of fast fill for the engagement-side element, as shown in the drawing, the actual hydraulic pressure for the engagement-side element does not become so high, but both the actual current for the disengagement-side element and the actual current for the engagement-side element may become relatively high.

Subsequently, after a predetermined time elapses (time t3) after the completion of the fast fill for the engagement-side element, torque phase control in which the hydraulic pressure for the disengagement-side element is gradually reduced and the hydraulic pressure for the engagement-side element is gradually increased to transition the torque transfer element from the disengagement-side element to the engagement-side element is executed. The torque phase refers to a state in which the engagement element on the engagement side being brought into the engaged state is starting to transfer torque but in which the engagement element on the disengagement side is not disengaged. In the torque phase, the speed of each element is not varied, and no inertia torque is generated. Then, when the input shaft speed Nin starts reducing (varying) to start an inertia phase (time t4), inertia phase control in which the hydraulic pressure for the engagement-side element is gently increased to change the input shaft speed Nin to a rotational speed (target rotational speed Nin*) matching the shift speed after shifting through slip engagement is executed. Here, the inertia phase refers to a state in which the engagement element on the engagement side and the engagement element on the disengagement side are sliding into engagement and disengagement, respectively. In the inertia phase, although not shown, a reduction process in which torque of the engine 12 is temporarily reduced is performed in order to suppress fluctuations in torque of the output shaft 32. Then, when the input shaft speed Nin becomes close to the target rotational speed Nin* (time t5), terminal control in which the hydraulic pressure of the engagement-side element is maximized is executed.

In the automatic transmission apparatus 20 according to the embodiment, in addition, the transmission ECU 80 performs drive control for the linear solenoid valves 52 to 58 of the hydraulic circuit 50 in order to cause the automatic transmission 30 to establish a shift speed. As drive control for the linear solenoid valve 52, first, a target current Ic1tag for the solenoid 52s is set on the basis of the accelerator operation amount Acc, the shift speed of the automatic transmission 30, torque of the input shaft 31 of the automatic transmission 30, the temperature of hydraulic oil of the hydraulic circuit 50, and so forth. Subsequently, the target current Ic1tag is set as a feedforward term Dffc1, and a feedback term Dfbc1 is set by the following formula (1) using the current Ic1 detected by the current sensor 52a and the target current Ic1tag. The sum of the set feedforward term Dffc1 and feedback term Dfbc1 is set to the command current value Ic1*. Then, drive control for the transistor 52t is performed by outputting to the transistor 52t a switching command for causing the transistor 52t to switch at a duty ratio (theoretically, the proportion of the on time to the sum of the on time and the off time of the transistor 52t) corresponding to the command current value Ic1*. Here, the formula (1) is a formula for calculating a feedback term for current feedback control for eliminating the difference between the current Tc1 and the target current Ic1tag. In the formula (1), "kp" in the first term on the right side is the gain of the proportional term, and "ki" in the second term on the right side is the gain of the integral term. Drive control for the linear solenoid valves 54 to 58 can be performed similarly to that for the linear solenoid valve 52. Through such drive control, the currents Ic1 to Ic3 and Ib1 detected by the current sensors 52a to 58a can be controlled to target currents Ic1tag to Ic3tag and Ib1tag.

$$Dfbc1 = kp(Ic1tag - Ic1) + ki \int (Ic1tag - Ic1) dt \quad (1)$$

Figure 9:
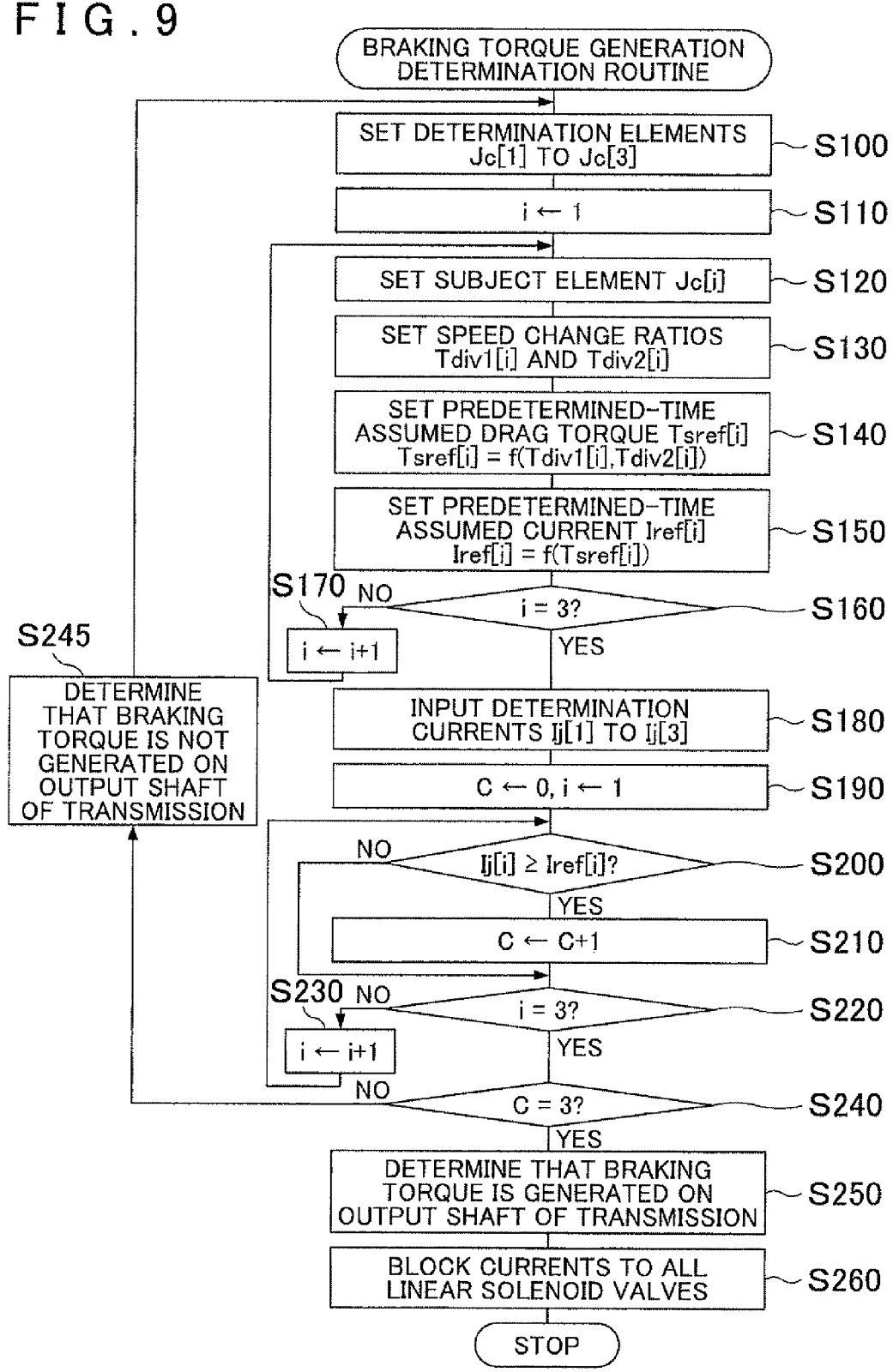
FIG. 9 is a flowchart showing an example of a braking torque generation determination routine executed by a transmission ECU 80.

Next, operation of the automatic transmission apparatus 20 according to the embodiment, particularly operation in determining whether or not braking torque is generated on the output shaft 32 of the automatic transmission 30 of the automatic transmission apparatus 20, will be described. FIG. 9 is a flowchart showing an example of a braking torque generation determination routine executed by the transmission ECU 80. Execution of the routine is started when the system is started. In the embodiment, it is determined by the braking torque generation determination routine whether or not braking torque is generated on the output shaft 32 of the automatic transmission 30 using the currents Ic1 to Ib1 applied to (flowing through) the solenoids of the linear solenoid valves 52 to 58 and acquired from the current sensors 52a to 58a. Here, it is considered that braking torque is generated on the output shaft 32 of the automatic transmission 30 in a rotation-prohibiting abnormal state in which three of the clutches C-1 to C-3 and the brake B-1 are engaged with an abnormality caused in the hydraulic circuit 50 (such as the solenoid valves 52 to 58), the transmission ECU 80, a signal transfer system between the transmission ECU 80 and the solenoid valves 52 to 58 of the hydraulic circuit 50, or the like. The brake B-2 is not considered on the basis of the fact that it is determined by the braking torque generation determination routine whether or not braking torque is generated on the output shaft 32 of the automatic transmission 30 using the currents Ic1 to Ib1 applied to the solenoids of the linear solenoid valves 52 to 58, and the fact that the hydraulic circuit 50 does not have a linear solenoid valve dedicated to the brake B-2. In addition, engagement (on state) of the clutches C-1 to C-3 and the brakes B-1 and B-2 includes not only complete engagement but also half engagement (engagement with a rotational speed difference between the input side and the output side).

When the braking torque generation determination routine is executed, the transmission ECU 80 first selects three of the clutches C-1 to C-3 and the brake B-1 to set the selected three as determination elements Jc[1] to Jc[3] that are used to determine whether or not braking torque is generated on the output shaft 32 of the automatic transmission 30 (step S100). In the embodiment, the three determination elements are set in different combinations such as the clutches C-1 to C-3 (pattern 1), the clutches C-1 and C-2 and the brake B-1 (pattern 2), the clutches C-1 and C-3 and the brake B-1 (pattern 3), the clutches C-2 and C-3 and the brake B-1 (pattern 4), the clutches C-1 to C-3 (pattern 1), ... upon each execution of the process in step S100.

When the three determination elements Jc[1] to Jc[3] are set in this way, a variable i is set to a value of 1 (step S110), and a determination element Jc[1] matching the variable i among the determination elements Jc[1] to Jc[3] is set as a subject element (hereinafter occasionally referred to as "subject element Jc[i]") (step S120).

Subsequently, the ratio in rotational speed between the input shaft 31 and the output shaft 32 of the automatic transmission 30 at the time when two non-subject elements among the three determination elements Jc[1] to Jc[3] excluding the subject element Jc[i] are engaged is set as a speed change ratio Tdiv1[i], and the ratio between a subject element rotational speed difference, which is the difference in rotational speed between the input side and the output side of the subject element Jc[i], and the rotational speed of the output shaft 32 of the automatic transmission 30 at the time when the two non-subject elements are engaged is set as a speed change ratio Tdiv2[i] (step S130). Here, the speed change ratios Tdiv1[i] and Tdiv2[i] are set by determining element speed change ratio correspondence, which is the relationship among the combination of the three determination elements Jc[1] to Jc[3], the subject element Jc[i], and the speed change ratios Tdiv1[i] and Tdiv2[i] in advance through an experiment, an analysis, or the like, storing the determined element speed change ratio correspondence in the ROM (not shown) of the transmission ECU 80, and deriving the speed change ratios Tdiv1[i] and Tdiv2[i] from the stored element speed change ratio correspondence for the combination of the three determination elements Jc[1] to Jc[3] and the subject element Jc[i] given. Here, the speed change ratio Tdiv2[i] corresponds to a value obtained by multiplying the ratio between the rotational speed of the input shaft 31 of the automatic transmission 30 and the subject element rotational speed difference by the speed change ratio Tdiv1[i]. For example, a case where the clutches C-1 to C-3 are set as the determination elements Jc[1] to Jc[3] and the determination element Jc[1] (clutch C-1) is set as the subject element Jc[i] is considered. In this case, in the process in step S130, the ratio in rotational speed between the input shaft 31 and the output shaft 32 (speed change ratio of the fifth speed of the automatic transmission 30) at the time when the two non-subject elements (clutches C-2 and C-3) are engaged is set as the speed change ratio Tdiv1[1], and the ratio in rotational speed between the input side of the clutch C-1 (on the carrier 39 side of the planetary gear mechanism 35) and the output shaft 32 at that shift speed (fifth speed) is set as the speed change ratio Tdiv2[1]. Here, the speed change ratio Tdiv2[1] corresponds to a value obtained by multiplying the ratio between the rotational speed of the input shaft 31 of the automatic transmission 30 and the difference in rotational speed between the input side (on the carrier 39 side of the planetary gear mechanism 35) and the output side (on the sun gear 41a side of the planetary gear mechanism 40) of the clutch C-1 by the speed change ratio Tdiv1[1], which is set to the speed change ratio of the fifth speed of the automatic transmission 30. In the case where the clutch C-1 or the clutch C-2 is the subject element Jc[i] and the clutch C-3 and the brake B-1 are non-subject elements, no shift speed is established by engagement of the clutch C-3 and the brake B-1. Therefore, in the embodiment, the speed change ratios Tdiv1[i] and Tdiv2[i] are not set.

Subsequently, predetermined-time assumed drag torque Tsref[i], which serves as drag torque assumed to be generated by engagement of the subject element Jc[i] when the three determination elements Jc[1] to Jc[3] are engaged, is set on the basis of the set speed change ratios Tdiv1[i] and Tdiv2[i] (step S140). Here, in the embodiment, the predetermined-time assumed drag torque Tsref[i] is calculated by the following formula (1) on the basis of the speed change ratios Tdiv1[i] and Tdiv2[i], input shaft torque Tin input to the input shaft 31 of the automatic transmission 30, and threshold braking torque Tbref determined as a boundary value for determining whether or not braking torque is acting on the output shaft 32 of the automatic transmission 30 with the three determination elements Jc[1] to Jc[3] engaged. In the embodiment, the input shaft torque Tin in the direction of increasing the rotational speed of the input shaft 31 (upward in FIG. 4) is defined as being positive, and the drag torque (torque in the direction of reducing the rotational speed on the input side of the subject element Jc[i] generated by engagement of the subject element Jc[i]) and the braking torque (torque in the direction of reducing the rotational speed of the output shaft 32 of the automatic transmission 30) in the opposite direction (downward in FIG. 4) are defined as being positive. In the formula (1), in addition, a value estimated on the basis of the throttle opening TH of the engine 12 and the state of the fluid transmission apparatus 22 is used for the input shaft torque Tin. The formula (1) is obtained as follows. Now, it is considered that the determination elements Jc[1] to Jc[3] are engaged. At this time, it is considered that torque obtained by subtracting torque (Ts[i]·Tdiv2[i]) from torque (Tin·Tdiv1[i]) acts on the output shaft 32 of the automatic transmission 30 as braking torque Tb as indicated by the formula (2). The torque (Ts[i]·Tdiv2[i]) is obtained by converting drag torque Ts[i], which is generated by engagement of the subject element Jc[i] when the three determination elements Jc[1] to Jc[3] are engaged, to torque that acts on the output shaft 32. The torque (Tin·Tdiv1[i]) is obtained by converting the input shaft torque Tin to torque that acts on the output shaft 32.

Thus, the formula (1) can be derived by replacing "Tb" and "Ts[i]" in the formula (2) with "Tbref" and "Tsref[i]", respectively, and further deforming the resulting formula. In the case where the speed change ratios Tdiv1[i] and Tdiv2[i] are not set in the process in step S130 discussed above, the predetermined-time assumed drag torque Tsref[i] cannot be computed by the formula (1). Therefore, in the embodiment, the predetermined-time assumed drag torque Tsref[i] is set to a value of 0 for convenience.

$$Tsref[i]=(Tin \cdot Tdiv1[i]-Tbref)/Tdiv2[i] \quad (1)$$

$$Tb=Tin \cdot Tdiv1[i]-Ts[i] \cdot Tdiv2[i] \quad (2)$$

Then, by converting the set predetermined-time assumed drag torque Tsref[i] into a hydraulic pressure to be supplied from a subject linear solenoid valve, which is a linear solenoid valve corresponding to the subject element Jc[i] among the linear solenoid valves 52 to 58, to the subject element Jc[i] and discharged in the other direction, and further converting the resulting hydraulic pressure into a current to be applied to the solenoid of the subject linear solenoid valve, a predetermined-time assumed current Iref[i], which serves as a current assumed to be applied to the solenoid of the subject linear solenoid valve when braking torque acts on the output shaft 32 with the three determination elements Jc[1] to Jc[3] engaged, is set (step S150). In the process in step S140 and the process in step S150 discussed above, for combinations of the three determination elements Jc[1] to Jc[3], the threshold braking torque Tbref is converted (scaled) into the predetermined-time assumed drag torque Tsref[i] in consideration of the speed change ratios Tdiv1[i] and Tdiv2[i] and the input shaft torque Tin, and the predetermined-time assumed drag torque Tsref[i] is converted (scaled) into the predetermined-time assumed current Iref[i]. In the case where the predetermined-time assumed drag torque Tsref[i] has a value of 0, the predetermined-time assumed current Iref[i] is set to a value of 0.

When the predetermined-time assumed current Iref[i] is set in this way, it is determined whether or not the variable i is equal to a value of 3, (the number of the determination elements Jc[1] to Jc[3]) (step S160). If it is determined that the variable i is less than a value of 3, the variable i is incremented (step S170), and the process returns to step S120. The predetermined-time assumed currents Iref[1] to Iref[3] for solenoids of respective linear solenoid valves (hereinafter referred to as "determination linear solenoid valves Jv[1] to Jv[3]") corresponding to the determination elements Jc[1] to Jc[3] among the linear solenoid valves 52 to 58 are set by repeatedly executing the processes in steps S120 to S170 in this way.

Then, if it is determined in step S160 that the variable i is equal to a value of 3, respective currents corresponding to the solenoids of the determination linear solenoid valves Jv[1] to Jv[3] among the currents (actual currents) Ic1 to Ib1 from the current sensors 52a to 58a are input as determination currents Ij[1] to Ij[3] (step S180). A counter C is set to a value of 0 as the initial value, and the variable i is set to a value of 1 (step S190). A comparison is made between the determination current Ij[i] and the predetermined-time assumed current Iref[i] (step S200). If the determination current Ij[i] is equal to or more than the predetermined-time assumed current Iref[i], the counter C is incremented (step S210). If the determination current Ij[i] is less than the predetermined-time assumed current Iref[i], the counter C is retained. Then, it is determined whether or not the variable i is equal to a value of 3, (the number of the determination currents Ij[1] to Ij[3]) (step S220). If it is determined that the variable i is less than a value of 3, the variable i is incremented (step S230), and the process returns to step S200. The determination currents Ij[1] to Ij[3] are compared with the corresponding predetermined-time assumed currents Iref[1] to Iref[3] to count the number of determination currents that are equal to or more than the corresponding predetermined-time assumed currents Iref[1] to Iref[3] among the determination currents Ij[1] to Ij[3] by repeatedly executing the processes in steps S200 to S230 in this way.

Then, if it is determined in step S220 that the variable i is equal to a value of 3, it is determined that the counter C is equal to a value of 3 (step S240). In the embodiment, three of the clutches C-1 to C-3 and the brake B-1 are set as the determination elements Jc[1] to Jc[3]. Thus, it is determined in the process in step S240 whether or not braking torque is generated on the output shaft 32 of the automatic transmission 30 when any of the second to sixth speeds should be established by engaging two of the clutches C-1 to C-3 and the brake B-1 (whether or not in the rotation-prohibiting abnormal state in which three of the clutches C-1 to C-3 and the brake B-1 are engaged with an abnormality caused in the hydraulic circuit 50, the transmission ECU 80, the signal transfer system between the hydraulic circuit 50 and the transmission ECU 80, or the like). If braking torque is not generated on the output shaft 32 of the automatic transmission 30 (not in the rotation-prohibiting abnormal state), it is considered that one or two of the determination elements Jc[1] to Jc[3] are engaged, and thus it is considered that the counter C has a value less than a value of 3 during execution of the process in step S240. If braking torque is generated on the output shaft 32 of the automatic transmission 30 (in the rotation-prohibiting abnormal state), on the other hand, it is considered that the counter C has a value of 3 during execution of the process in step S240 in the case where three of the clutches C-1 to C-3 and the brake B-1 being engaged are set as the determination elements Jc[1] to Jc[3], and it is considered that the counter C has a value less than a value of 3 during execution of the process in step S240 in the case where two of the clutches C-1 to C-3 and the brake B-1 being engaged and one of the clutches and the brake being disengaged are set as the determination elements Jc[1] to Jc[3]. In the case where a combination of the clutches C-1 and C-3 and the brake B-1 or a combination of the clutches C-2 and C-3 and the brake B-1 is set as the three determination elements Jc[1] to Jc[3], the predetermined-time assumed current Iref[i] is set to a value of 0 when the clutch C-1 or the clutch C-2 is set as the subject element Jc[i]. Thus, the counter C is incremented irrespective of whether or not the clutch C-1 or the clutch C-2 is engaged in the comparison between the determination current Ij[i] and the predetermined-time assumed current Iref[i] (with a value of 0) corresponding to the clutch C-1 or the clutch C-2. In case of such combinations, however, no shift speed is established by engagement of the clutch C-3 and the brake B-1. Therefore, it is considered that the counter C does not have a value of 3 during execution of the process in step S240 when braking torque is not generated on the output shaft 32 of the automatic transmission 30 (not in the rotation-prohibiting abnormal state). That is, it is considered that it is not erroneously determined that braking torque is generated on the output shaft 32 of the automatic transmission 30 (in the rotation-prohibiting abnormal state) when the hydraulic circuit 50, the transmission ECU 80, the signal transfer system between the hydraulic circuit 50 and the transmission ECU 80, and so forth are normal.

If it is determined in step S240 that the counter C is equal to a value of 3, it is determined that braking torque is generated on the output shaft 32 of the automatic transmission 30 (in the rotation-prohibiting abnormal state) (step S250), application of a current to all of the solenoids 52s to 58s of the linear solenoid valves 52 to 58 is stopped (step S260), and the routine is terminated. In this way, it is determined that braking torque is generated on the output shaft 32 of the automatic transmission 30 (in the rotation-prohibiting abnormal state) when the determination currents Ij[1] to Ij[3] are compared with the corresponding predetermined-time assumed currents Iref[1] to Iref[3] and all of the determination currents Ij[1] to Ij[3] are equal to or more than the corresponding predetermined-time assumed currents Iref[1] to Iref[3]. Thus, the determination can be made more adequately (an erroneous determination can be suppressed) compared to a case where it is determined whether or not braking torque is generated on the output shaft 32 of the automatic transmission 30 by comparing the total sum of the determination currents Ij[1] to Ij[3] and a threshold. In addition, it is determined whether or not braking torque is generated on the output shaft 32 of the automatic transmission 30 by using respective currents (actual currents) corresponding to the solenoids of the determination linear solenoid valves Jv[1] to Jv[3] among the currents (actual currents) Ic1 to Ib1 from the current sensors 52a to 58a as the determination currents Ij[1] to Ij[3]. Thus, the determination can be made more adequately in the light of the effect of the hydraulic pressures of the determination linear solenoid valves Jv[1] to Jv[3] (such as fluctuations in counter-electromotive force (current) of the solenoids of the determination linear solenoid valves Jv[1] to Jv[3] due to fluctuations in hydraulic pressure, for example) etc. compared to a case where it is determined whether or not braking torque is generated on the output shaft 32 of the automatic transmission 30 by using respective current command values to be applied to the solenoids of the determination linear solenoid valves Jv[1] to Jv[3] as the determination currents Ij[1] to Ij[3]. Moreover, for combinations of the three determination elements Jc[1] to Jc[3], the speed change ratios Tdiv1[1] to Tdiv1[3] and Tdiv2[1] to Tdiv2[3] are set, the predetermined-time assumed drag torques Tsref[1] to Tsref[3] matching the threshold braking torque Tbref are set using the speed change ratios Tdiv1[1] to Tdiv1[3] and Tdiv2[1] to Tdiv2[3], and the predetermined-time assumed currents Iref[1] to Iref[3] are set by converting the predetermined-time assumed drag torques Tsref[1] to Tsref[3] into currents. Thus, the predetermined-time assumed currents Iref[1] to Iref[3] can be set more appropriately. Further, when it is determined that braking torque is generated on the output shaft 32 of the automatic transmission 30 (in the rotation-prohibiting abnormal state), application of a current to all the solenoids 52s to 58s of the linear solenoid valves 52 to 58 is stopped. Thus, it is possible to suppress abrupt braking of the vehicle with large braking torque acting on the output shaft 32 of the automatic transmission 30 in the rotation-prohibiting abnormal state, and to cancel a state in which abrupt braking is caused.

If the counter C has a value less than a value of 3 in step S240, on the other hand, it is determined that braking torque is not generated on the output shaft 32 of the automatic transmission 30 (not in the rotation-prohibiting abnormal state) (step S245), and the process returns to step S100. Three of the clutches C-1 to C-3 and the brake B-1 in a combination different from that in the previous process are set as the determination elements Jc[1] to Jc[3] (step S100), and the processes in and after step S110 are executed. Here, in the process in step S100, as discussed above, the three determination elements Jc[1] to Jc[3] are set in a different combination. In this way, it is determined whether or not braking torque is generated on the output shaft 32 of the automatic transmission 30 while changing the combination of the three determination elements Jc[1] to Jc[3]. Thus, when braking torque is generated on the output shaft 32 of the automatic transmission 30 (in the rotation-prohibiting abnormal state), such braking torque can be detected more reliably.

With the automatic transmission apparatus 20 according to the embodiment described above, it is determined whether or not braking torque is generated on the output shaft 32 of the automatic transmission 30 (whether or not in the rotation-prohibiting abnormal state in which three of the clutches C-1 to C-3 and the brake B-1 are engaged with an abnormality caused in the hydraulic circuit 50, the transmission ECU 80, the signal transfer system between the hydraulic circuit 50 and the transmission ECU 80, or the like) by using respective currents applied to the solenoids of the determination linear solenoid valves Jv[1] to Jv[3] among the linear solenoid valves 52 to 58 as the determination currents Ij[1] to Ij[3]. Thus, the determination can be made more adequately (an erroneous determination can be suppressed) compared to a case where it is determined whether or not braking torque is generated on the output shaft 32 of the automatic transmission 30 by using respective current command values to be applied to the solenoids of the determination linear solenoid valves Jv[1] to Jv[3] as the determination currents Ij[1] to Ij[3].

With the automatic transmission apparatus 20 according to the embodiment, moreover, it is determined whether or not braking torque is generated on the output shaft 32 of the automatic transmission 30 (whether or not in the rotation-prohibiting abnormal state) by setting three of the clutches C-1 to C-3 and the brake B-1 as the determination elements Jc[1] to Jc[3], setting the predetermined-time assumed currents Iref[1] to Iref[3] on the basis of the combination of the set three determination elements Jc[1] to Jc[3], defining respective currents applied to the solenoids of the determination linear solenoid valves Jv[1] to Jv[3] corresponding to the determination elements Jc[1] to Jc[3] among the linear solenoid valves 52 to 58 as the determination currents Ij[1] to Ij[3], and comparing the determination currents Ij[1] to Ij[3] and the corresponding predetermined-time assumed currents Iref[1] to Iref[3]. Thus, the determination can be made more adequately (an erroneous determination can be suppressed) compared to a case where it is determined whether or not braking torque is generated on the output shaft 32 of the automatic transmission 30 by comparing the total sum of the determination currents Ij[1] to Ij[3] and a threshold.

In the automatic transmission apparatus 20 according to the embodiment, the predetermined-time assumed current Iref[i] is set by converting the predetermined-time assumed drag torque Tsref[i] for the subject element Jc[i] into a hydraulic pressure to be supplied from the subject linear solenoid valve to the subject element Jc[i] and discharged in the other direction, and further converting the resulting hydraulic pressure into a current to be applied to the solenoid of the subject linear solenoid valve. However, the predetermined-time assumed current Iref[i] may be set by directly converting the predetermined-time assumed drag torque Tsref[i] for the subject element Jc[i] into a current.

In the automatic transmission apparatus 20 according to the embodiment, the predetermined-time assumed current Iref[i] is set by setting the predetermined-time assumed drag torque Tsref[i] for the subject element Jc[i] on the basis of the input shaft torque Tin and the speed change ratios Tdiv1[i] and Tdiv2[i], and converting the set predetermined-time assumed drag torque Tsref[i] into a current. However, it is only necessary that the predetermined-time assumed current Iref[i] should be set on the basis of the combination of the three determination elements Jc[1] to Jc[3], and the predetermined-time assumed current Iref[i] may be directly set on the basis of the input shaft torque Tin, the speed change ratios Tdiv1[i] and Tdiv2[i], or the like.

In the automatic transmission apparatus 20 according to the embodiment, three of the clutches C-1 to C-3 and the brake B-1 are defined as the determination elements Jc[1] to Jc[3] and used in the determination as to whether or not braking torque is generated on the output shaft 32 of the automatic transmission 30 (in the rotation-prohibiting abnormal state). However, in the case where the hydraulic circuit 50 has a linear solenoid valve dedicated to the brake B-2, three of the clutches C-1 to C-3 and the brakes B-1 and B-2 may be defined as the determination elements Jc[1] to Jc[3] and used in the determination as to whether or not braking torque is generated on the output shaft 32 of the automatic transmission 30.

In the automatic transmission apparatus 20 according to the embodiment, execution of the braking torque generation determination routine of FIG. 9 is started when the system is started, and the processes in steps S100 to S245 are basically repeatedly executed (it is repeatedly determined whether or not braking torque is generated on the output shaft 32 of the automatic transmission 30). However, the processes may not be executed during execution of fast fill for the engagement-side element for changing the shift speed of the automatic transmission 30 (time t1 to time t2 of FIG. 8). During execution of fast fill, the actual hydraulic pressure for the engagement-side element does not become so high, but both the actual current flowing through the solenoid of the linear solenoid valve corresponding to the engagement-side element and the actual current flowing through the solenoid of the linear solenoid valve corresponding to the disengagement-side element may become equal to or more than a current threshold. Therefore, an erroneous determination may be made if it is determined whether or not braking torque is generated on the output shaft 32 of the automatic transmission 30 during execution of fast fill. In the light of this fact, an erroneous determination as to whether or not braking torque is generated on the output shaft 32 of the automatic transmission 30 can be suppressed by not determining whether or not braking torque is generated on the output shaft 32 of the automatic transmission 30 during execution of fast fill.

In the automatic transmission apparatus 20 according to the embodiment, the current monitor circuit 82 which monitors the currents (actual currents) Ic1 to Ic3 and Ib1 (see FIG. 6) from the current sensors 52a to 58a is provided in the transmission ECU 80. However, the current monitor circuit 82 may be provided in a control device other than the transmission ECU 80, for example the engine ECU 16 which controls the engine 12. In addition, the current sensors themselves may be provided with a calculation unit that calculates an actual current, and may transfer the calculation results (actual current value) to the current monitor circuit 82.

In the automatic transmission apparatus 20 according to the embodiment, the respective predetermined-time assumed currents Iref[1] to Iref[3] for the solenoids of the determination linear solenoid valves Jv[1] to Jv[3] have different values (values matching the predetermined-time assumed drag torques Tsref[1] to Tsref[3]). However, the respective predetermined-time assumed currents Iref[1] to Iref[3] for the solenoids of the determination linear solenoid valves Jv[1] to Jv[3] may have the same value.

In the automatic transmission apparatus 20 according to the embodiment, it is determined whether or not braking torque is generated on the output shaft 32 of the automatic transmission 30 by comparing the determination currents Ij[1] to Ij[3] serving as respective currents applied to the solenoids of the determination linear solenoid valves Jv[1] to Jv[3] and the predetermined-time assumed currents Iref[1] to Iref[3] corresponding to the solenoids of the determination linear solenoid valves Jv[1] to Jv[3]. However, it may be determined whether or not braking torque is generated on the output shaft 32 of the automatic transmission 30 by comparing the total sum of the determination currents Ij[1] to Ij[3] and a current threshold.

In the automatic transmission apparatus 20 according to the embodiment, the linear solenoid valves 52 to 58 of the hydraulic circuit 50 are each formed as a normally closed type. However, the linear solenoid valves 52 to 58 may each be formed as a normally open type, or some of the linear solenoid valves 52 to 58 may be formed as a normally closed type and the remainder may be formed as a normally open type. In the case where the linear solenoid valves (determination linear solenoid valves) Jv[1] to Jv[3] corresponding to the three determination elements Jc[1] to Jc[3] among the linear solenoid valves 52 to 58 are each formed as a normally open type, it may be determined that braking torque is generated on the output shaft 32 of the automatic transmission 30 when all of the determination currents Ij[1] to Ij[3] are equal to or less than the corresponding current threshold. Meanwhile, in the case where some of the determination linear solenoid valves Jv[1] to Jv[3] are formed as a normally closed type and the remainder are formed as a normally open type, it may be determined that braking torque is generated on the output shaft 32 of the automatic transmission 30 when the determination currents for the solenoids of the normally closed solenoid valves are equal to or more than the current threshold and the determination currents for the solenoids of the normally open solenoid valves are equal to or less than the current threshold.

In the automatic transmission apparatus 20 according to the embodiment, the automatic transmission apparatus 20 includes the automatic transmission 30 which establishes a plurality of shift speeds by engaging two engagement elements (clutches and brakes), and it is determined whether or not braking torque is generated on the output shaft 32 of the automatic transmission 30 with three (a value that is larger than the number of engagement elements required to establish a shift speed by one) engagement elements engaged. However, it may be additionally determined whether or not braking torque is generated on the output shaft 32 of the automatic transmission 30 with four or more (a value that is larger than the number of engagement elements required to establish a shift speed by two or more and that is equal to or less than the number of the solenoid valves) engagement elements engaged.

In the automatic transmission apparatus 20 according to the embodiment, all of the three clutches C-1 to C-3 and the two brakes B-1 and B-2 are formed as friction clutches and friction brakes. However, some of the clutches (brakes) may be formed as dog clutches (dog brakes) rather than the friction clutches (friction brakes).

In the automatic transmission apparatus 20 according to the embodiment, the automatic transmission 30 is configured to establish six forward speeds by engaging two engagement elements (clutches and brakes). However, the automatic transmission 30 may be configured to establish a plurality of forward speeds by engaging three or more engagement elements (clutches and brakes). In the case where a plurality of shift speeds are established by engaging n1 ($2 \leq n1 < m$) engagement elements using the hydraulic pressures of n1 solenoid valves among m solenoid valves ($m \geq 3$), it may be determined whether or not braking torque is generated on the output shaft 32 of the automatic transmission 30 by comparing the respective values of actual currents flowing through the solenoids of n2 ($n1 < n2 \leq m$) solenoid valves and a current threshold.

A modified example of the present invention provides
an automatic transmission apparatus including three or more friction engagement elements and a hydraulic circuit that supplies and discharges a hydraulic fluid to and from the friction engagement elements through solenoid valves corresponding to the friction engagement elements, the automatic transmission apparatus being configured to establish a plurality of shift speeds by engaging two friction engagement elements among the three or more friction engagement elements in different combinations, the automatic transmission apparatus including:
a determination element setting unit that sets three friction engagement elements among the three or more friction engagement elements as determination elements that are used to determine whether or not an abnormality is caused in the hydraulic circuit;
a predetermined-time assumed current setting unit that sets, for each of three solenoid valves corresponding to the set three determination elements, a predetermined-time assumed current, which serves as a lower-limit current assumed to be applied when braking torque acts on an output shaft of the transmission with the set three determination elements engaged, on the basis of the combination of the set three determination elements; and
an abnormality determination unit that determines that an abnormality is caused in the hydraulic circuit when a current applied to each of the three solenoid valves corresponding to the set three determination elements is equal to or more than the set predetermined-time assumed current corresponding to that solenoid valve.

In the automatic transmission apparatus according to the modified example of the present invention, three friction engagement elements among the three or more friction engagement elements are set as determination elements that are used to determine whether or not an abnormality is caused in the hydraulic circuit; for each of three solenoid valves corresponding to the set three determination elements, a predetermined-time assumed current, which serves as a lower-limit current assumed to be applied when braking torque acts on an output shaft of the transmission with the three determination elements engaged, is set on the basis of the combination of the three determination elements; and it is determined that an abnormality is caused in the hydraulic circuit when a current applied to each of the three solenoid valves corresponding to the three determination elements is equal to or more than the predetermined-time assumed current corresponding to that solenoid valve. This makes it possible to more adequately determine whether or not an abnormality is caused in the hydraulic circuit, specifically whether or not the three friction engagement elements are engaged with an abnormality caused in the hydraulic circuit, compared to a case where it is determined whether or not an abnormality is caused in the hydraulic circuit by comparing the total sum of the three currents with a threshold. Here, the predetermined-time assumed current for each of the three solenoid valves corresponding to the three determination elements is set on the basis of the combination of the three determination elements because the relationship in rotational speed between each of the three determination elements and the output shaft of the transmission differs among the combinations of the three determination elements, and thus the relationship between braking torque that acts on the output shaft of the transmission when the three determination elements are engaged and a current assumed to be applied to each of the three solenoid valves at that time is also considered to differ among the combinations of the three determination elements. In addition, the friction engagement elements include clutches that connect and disconnect two rotary systems to and from each other, and brakes that fix and unfix a rotary system to and from a non-rotary system such as a case. Further, engagement of the friction engagement elements includes not only complete engagement but also half engagement (engagement with a rotational speed difference between the input side and the output side of the friction engagement elements).

In the automatic transmission apparatus according to the modified example of the present invention, the predetermined-time assumed current setting unit may execute a predetermined-time assumed current setting process in which defining one of the set three determination elements as a subject element, a predetermined-time assumed current, which serves as a lower-limit current assumed to be applied to a subject solenoid valve, which is a solenoid valve corresponding to the subject element, when braking torque acts on the output shaft of the transmission with the set three determination elements engaged, on the basis of the combination of the set three determination elements, the predetermined-time assumed current setting unit executing the predetermined-time assumed current setting process with each of the three determination elements defined as the subject element. Here, the predetermined-time assumed current for the subject solenoid valve is set on the basis of the combination of the three determination elements because the relationship in rotational speed between the subject element and the output shaft of the transmission differs among the combinations of the three determination elements, and thus the relationship between braking torque that acts on the output shaft of the transmission when the three determination elements are engaged and a current assumed to be applied to the subject solenoid valve at that time is also considered to differ among the combinations of the three determination elements.

In the automatic transmission apparatus according to the modified example of the present invention, in addition, the predetermined-time assumed current setting unit performs the predetermined-time assumed current setting process by setting predetermined-time assumed drag torque, which serves as drag torque assumed to be generated by engagement of the subject element when the three determination elements are engaged, on the basis of a first speed change ratio, a second speed change ratio, and torque input to an input shaft of the transmission, the first speed change ratio being a ratio in rotational speed between the input shaft and the output shaft of the transmission at the time when two non-subject elements, which are two of the three determination elements excluding the subject element, are engaged, and the second speed change ratio being a ratio between a subject element rotational speed difference, which is a difference in rotational speed between an input side and an output side of the subject element, and a rotational speed of the output shaft of the transmission at the time when the two non-subject elements are engaged, and setting a current applied to the subject solenoid valve corresponding to the set predetermined-time assumed drag torque as the predetermined-time assumed current. In this case, the second speed change ratio may be obtained on the basis of the first speed change ratio, a rotational speed of the input shaft of the transmission, and the subject element rotational speed difference. This makes it possible to set the predetermined-time assumed current more appropriately.

In the automatic transmission apparatus according to the modified example of the present invention, in addition, the determination element setting unit may execute a process in which three of the friction engagement elements, the number of which is four or more, are selected and set as the determination elements while changing the combination of the three friction engagement elements.

The automatic transmission apparatus according to the modified example of the present invention may further include a current stopping unit that stops application of a current to all of the three or more solenoid valves when the abnormality determination unit determines that an abnormality is caused in the hydraulic circuit. This makes it possible to suppress large braking torque acting on the output shaft of the transmission, and to cancel a state in which large braking torque is acting on the output shaft.

A modified example of the present invention also provides an abnormality determination method for a hydraulic circuit in an automatic transmission apparatus including three or more friction engagement elements and a hydraulic circuit that supplies and discharges a hydraulic fluid to and from the friction engagement elements through solenoid valves corresponding to the friction engagement elements, the automatic transmission apparatus being configured to establish a plurality of shift speeds by engaging two friction engagement elements among the three or more friction engagement elements in different combinations, the abnormality determination method including the steps of:

(a) setting three friction engagement elements among the three or more friction engagement elements as determination elements that are used to determine whether or not an abnormality is caused in the hydraulic circuit;

(b) setting, for each of three solenoid valves corresponding to the set three determination elements, a predetermined-time assumed current, which serves as a lower-limit current assumed to be applied when braking torque acts on an output shaft of the transmission with the set three determination elements engaged, on the basis of the combination of the set three determination elements; and (c) determining that an abnormality is caused in the hydraulic circuit when a current applied to each of the three solenoid valves corresponding to the set three determination elements is equal to or more than the set predetermined-time assumed current corresponding to that solenoid valve.

In the abnormality determination method for a hydraulic circuit in an automatic transmission apparatus according to the modified example of the present invention, three friction engagement elements among the three or more friction engagement elements are set as determination elements that are used to determine whether or not an abnormality is caused in the hydraulic circuit; for each of three solenoid valves corresponding to the set three determination elements, a predetermined-time assumed current, which serves as a lower-limit current assumed to be applied when braking torque acts on an output shaft of the transmission with the three determination elements engaged, is set on the basis of the combination of the three determination elements; and it is determined that an abnormality is caused in the hydraulic circuit when a current applied to each of the three solenoid valves corresponding to the three determination elements is equal to or more than the predetermined-time assumed current corresponding to that solenoid valve. This makes it possible to more adequately determine whether or not an abnormality is caused in the hydraulic circuit, specifically whether or not the three friction engagement elements are engaged with an abnormality caused in the hydraulic circuit, compared to a case where it is determined whether or not an abnormality is caused in the hydraulic circuit by comparing the total sum of the three currents with a threshold. Here, the predetermined-time assumed current for each of the three solenoid valves corresponding to the three determination elements is set on the basis of the combination of the three determination elements because the relationship in rotational speed between each of the three determination elements and the output shaft of the transmission differs among the combinations of the three determination elements, and thus the relationship between braking torque that acts on the output shaft of the transmission when the three determination elements are engaged and a current assumed to be applied to each of the three solenoid valves at that time is also considered to differ among the combinations of the three determination elements. In addition, the friction engagement elements include clutches that connect and disconnect two rotary systems to and from each other, and brakes that fix and unfix a rotary system to and from a non-rotary system such as a case. Further, engagement of the friction engagement elements includes not only complete engagement but also half engagement (engagement with a rotational speed difference between the input side and the output side of the friction engagement elements).

Figures 10, 11:
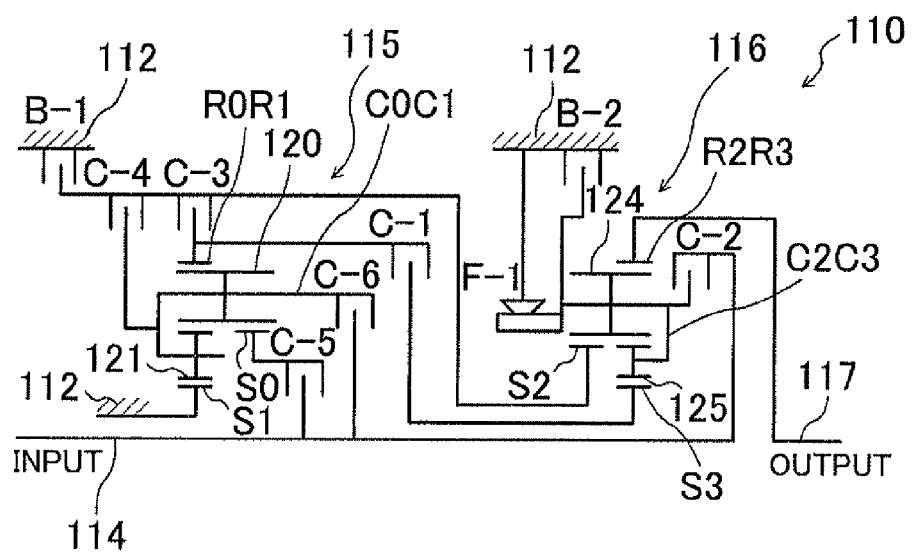
FIG. 10 is a diagram showing a schematic configuration of an automatic transmission 110 according to a modified example.
FIG. 11 is an operation table of the automatic transmission 110 according to the modified example.

FIG. 10 is a diagram showing a schematic configuration of an automatic transmission 110 according to the modified example in which three engagement elements (clutches and brakes) are engaged to establish ten forward speeds. FIG. 11 is an operation table of the automatic transmission 110 according to the modified example. The automatic transmission 110 shown in FIG. 10 includes an input shaft 114 connected to an engine side, a speed-reducing composite planetary gear 115, a speed-changing composite planetary gear 116, an output shaft 117 connected to a drive wheel side, clutches C-1, C-2, C-3, C-4, C-5, and C-6, brakes B-1 and B-2, a one-way clutch F-1, etc. The speed-reducing composite planetary gear 115 includes a speed-reducing common carrier C0C1 that rotatably supports a long pinion 120 and a pinion 121 meshed with each other, a first sun gear S0 meshed with the long pinion 120, a second sun gear S1 meshed with the pinion 121, and a speed-reducing common ring gear R0R1 meshed with the long pinion 120. The speed-changing composite planetary gear 116 includes a speed-changing common carrier C2C3 that rotatably supports a long pinion 124 and a pinion 125 meshed with each other, a third sun gear S2 meshed with the long pinion 124, a fourth sun gear S3 meshed with the pinion 125, and a speed-changing common ring gear R2R3 meshed with the long pinion 124. In the speed-reducing composite planetary gear 115, the first sun gear S0 can be coupled to the input shaft 114 via the clutch C-5, and the second sun gear S1 is fixed to a transmission case 112. The speed-reducing common carrier C0C1 can be coupled to the input shaft 114 via the clutch C-6. The third sun gear S2 of the speed-changing composite planetary gear 116 is selectively coupled to the speed-reducing common carrier C0C1 of the speed-reducing composite planetary gear 115 via the clutch C-4, selectively coupled to the speed-reducing common ring gear R0R1 via the clutch C-3, and selectively fixed via the brake B-1. The speed-changing common carrier C2C3 is selectively coupled to the input shaft 114 via the clutch C-2, selectively fixed via the brake B-2, and coupled to the transmission case 112 via the one-way clutch F-1, which is disposed in parallel with the brake B-2, so as not to rotate in reverse. The fourth sun gear S3 is selectively coupled to the speed-reducing common ring gear R0R1 via the clutch C-1. The speed-changing common ring gear R2R3 is directly coupled to the output shaft 117. In the automatic transmission 110 configured as described above, ten forward speeds and four reverse speeds can be established by selectively engaging the clutches C-1 to C-6, selectively engaging the brakes B-1 and B-2, and selectively coupling or fixing the input shaft 114, the output shaft 117, and the respective elements of the speed-reducing composite planetary gear 115 and the speed-changing composite planetary gear 116. In the operation table of FIG. 11, a symbol "◯" provided in the field of the clutches C-1 to C-6, the brakes B-1 and B-2, and the one-way clutch F-1 corresponding to each shift speed indicates an engaged, coupled state for a clutch and an engaged, fixed state for a brake. A symbol "(◯)" indicates that a hydraulic pressure is supplied in preparation for shifting so that the shifting is performed smoothly, but that the clutch is not transferring torque. A symbol "●" indicates that the brake is engaged when engine braking is applied.

In case of the automatic transmission 110, for example, the sixth speed as the target shift speed is established by the clutches C-1, C-2, and C-6, but braking torque is generated on the output shaft of the transmission when the clutches C-1, C-2, and C-6 and the brake B-1 are engaged. That is, the n1 ($2 \leq n1 < m$) solenoid valves correspond to the solenoid valves for the clutches C-1, C-2, and C-6, and the n2 ($n1 < n2 \leq m$) solenoid valves correspond to the solenoid valves for the clutches C-1, C-2, and C-6 and the brake B-1.

In the automatic transmission apparatus 20 according to the embodiment, the 6-speed automatic transmission 30 is used. However, a 3-speed, 4-speed, or 5-speed automatic transmission may be used, or an automatic transmission with seven, eight, or more speeds may be used.

In the embodiment, the present invention is applied to the automatic transmission apparatus 20. However, the present invention may be applied to an abnormality determination method for the hydraulic circuit 50 of the automatic transmission apparatus 20. Alternatively, the present invention may be applied to the transmission ECU 80 serving as a control device for a transmission, or may be applied to a braking torque generation determination method for a transmission for determining whether or not braking torque is generated on an output shaft of the transmission.

The correspondence between the main elements of the embodiment and the main elements of the invention described in the "SUMMARY OF THE INVENTION" section will be described. In the embodiment, the current sensors 52a to 58a correspond to an "actual current value detection unit", and the transmission ECU 80 which executes the braking torque generation determination routine of FIG. 9 corresponds to a "determination unit".

The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUM- MARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

The present invention is applicable to the automatic transmission apparatus manufacturing industry and so forth.

The invention claimed is:

1. A control device for a transmission including m (m≥3) solenoid valves, each solenoid being paired with a feedback current sensor used to provide feedback to the respective solenoid valve, the solenoid valves configured to establish a plurality of shift speeds by engaging n1 (2≤n1<m) engagement elements using hydraulic pressures of n1 solenoid valves among the m solenoid valves, and the solenoid valves configured to establish a braking torque on an output shaft by engaging n2 solenoid valves (n1<n2≤m), the control device comprising:
   an actual current value detection unit that detects respective values of actual currents flowing through each solenoid of the m solenoid valves by measuring current passing through the respective feedback current sensors oriented between each of the m solenoid valves and ground;
   a current threshold determination unit that calculates respective current thresholds for each of the n2 solenoid valves, each respective current threshold for a respective solenoid valve calculated on a basis that the respective solenoid valve of the n2 solenoid valves is slipped and each of the n1 engagement elements corresponding to each of the n1 solenoid valves is engaged, while each of the n2 solenoid valves is supplied with hydraulic pressure; and
   a determination unit that determines whether or not braking torque is generated on an output shaft of the transmission by comparing the detected actual current values for solenoids of the n2 solenoid valves with their respective current threshold value,
   wherein the respective current threshold values are varied on the basis of a speed change ratio established by engaging engagement elements corresponding to the n1 solenoid valves among the n2 solenoid valves.

2. The control device for a transmission according to claim 1, wherein
   the determination unit is configured not to determine whether or not braking torque is generated on the output shaft of the transmission during execution of fast fill for changing a shift speed of the transmission.

3. The control device for a transmission according to claim 1, wherein
   the determination unit determines that braking torque is generated on the output shaft of the transmission when the detected actual current values for the solenoids of the n2 solenoid valves which are normally closed are equal to or more than the current threshold.

4. The control device for a transmission according to claim 1, wherein
   the determination unit determines that braking torque is generated on the output shaft of the transmission when the detected actual current values for the solenoids of the n2 solenoid valves which are normally open are equal to or less than the current threshold.

5. The control device for a transmission according to claim 1, wherein
   the determination unit determines that braking torque is generated on the output shaft of the transmission when the detected actual current values for solenoids of normally closed solenoid valves among the n2 solenoid valves are equal to or more than the current threshold and the detected actual current values for solenoids of normally open solenoid valves among the n2 solenoid valves are equal to or less than the current threshold.

6. A braking torque generation determination method for a transmission for determining whether or not braking torque is generated on an output shaft of the transmission, the transmission including m (m≥3) solenoid valves, being configured to establish a plurality of shift speeds by engaging n1 (2≤n1<m) engagement elements using hydraulic pressures of n1 solenoid valves among the m solenoid valves, and being configured to establish a braking torque on an output shaft by engaging n2 solenoid valves (n1<n2≤m), the braking torque generation determination method comprising the steps of:
   (a) detecting respective values of actual currents flowing through each solenoid of the m solenoid valves by measuring current passing through respective feedback current sensors oriented between each of the m solenoid valves and ground;
   (b) calculating respective current thresholds for each of the n2 solenoid valves, each respective current threshold for a respective solenoid valve calculated on a basis that the respective solenoid valve of the n2 solenoid valves is slipped and each of the n1 engagement elements corresponding to each of the n1 solenoid valves is engaged, while each of the n2 solenoid valves is supplied with hydraulic pressure;
   (b) determining whether or not braking torque is generated on the output shaft of the transmission by comparing the detected actual current values for solenoids of the n2 solenoid valves with their respective current threshold value, wherein the current threshold is varied on the basis of a speed change ratio established by engaging engagement elements corresponding to the n1 solenoid valves among the n2 solenoid valves; and
   (c) based upon the determination that a braking torque is generated on the output shaft of the transmission, sending a command to stop current from flowing through solenoids of the m solenoid valves.

* * * * *